United States Patent [19]

Matsuo et al.

[11] Patent Number: 4,796,175
[45] Date of Patent: Jan. 3, 1989

[54] INSTRUCTION FETCHING IN DATA PROCESSING APPARATUS

[75] Inventors: Masahito Matsuo; Toyohiko Yoshida, both of Hyogo, Japan

[73] Assignee: Mitsubishi Denki Kabushiki Kaisha, Tokyo, Japan

[21] Appl. No.: 34,093

[22] Filed: Apr. 2, 1987

[30] Foreign Application Priority Data

Aug. 27, 1986 [JP] Japan .............................. 61-202041

[51] Int. Cl.⁴ .............................................. G06F 9/38
[52] U.S. Cl. .................................................. 364/200
[58] Field of Search ............................ 364/200, 900

[56] References Cited

U.S. PATENT DOCUMENTS 4,008,460 2/1977 Bryant et al. .................... 364/200
4,562,537 12/1985 Barnett et al. .................... 364/200
4,691,277 9/1987 Kronstadt et al. ................. 364/200

Primary Examiner—Raulfe B. Zache
Attorney, Agent, or Firm—Wolf, Greenfield & Sacks

[57] ABSTRACT

A microprocessor has a main memory, an instruction execution unit, and instruction queue for prefetching a series of instructions from the main memory, and an instruction cache. The instruction cache prefetches and stores an instruction next to those stored in the instruction queue by use of its address tag as an index when an amount of data fetched in the instruction queue is below a constant value. The fetching of the next instruction into the instruction queue from the instruction cache is achieved at the time to execute the same instruction again.

5 Claims, 2 Drawing Sheets

INSTRUCTION FETCHING IN DATA PROCESSING APPARATUS

BACKGROUND OF THE INVENTION:

The present invention relates to a data processing apparatus having a function to prefetch instructions and, more particularly, to a microprocessor of such an apparatus.

FIG. 3 is a block diagram of a conventional microprocessor having a function to prefetch instructions. In FIG. 3, reference numeral 1 denotes an instruction queue, 2 denotes an operation decoder, and 3 denotes an instruction execution unit.

The operation of the microprocessor in FIG. 3 will now be described. In the microprocessor, the time for accessing the main memory is extremely longer than the time for accessing the data stored in the processor. In the case of accessing the main memory every time an instruction is fetched, the effective speed will not rise even if the operation speed of microprocessor is increased. To improve this drawback, in the microprocessor in FIG. 3, instructions are previously stored into the instruction queue 1 by useing the time when the main memory is not accessed, the instruction to be executed next is fetched into the operation decoder 2 from the instruction queue 1, thereby raising the effective speed of the microprocessor. However, after a certain series of instructions were executed, when the operation decoder 2 issues a request to fetch the instructions to the instruction queue 1, if the instruction queue 1 is empty, the instruction to be executed next must be directly fetched into the instruction queue 1 from the main memory.

As described above, the conventional data processing apparatus having the instruction prefetching function has such a problem that when the instruction queue 1 is empty, the execution of instructions must be interrupted for the period of time until the instruction to be executed next is directly fetched from the main memory, so that the executing speed is decreased.

SUMMARY OF THE INVENTION

The present invention is made in consideration of the foregoing drawbacks and it is an object of the invention to provide a data processing apparatus in which the possibility such that the instruction queue becomes empty is low.

To accomplish the above object, a data processing apparatus according to the present invention comprises: a first memory device for storing a plurality of instructions into a plurality of areas which were ordered by area recognizing symbols based on a predetermined rule; an execution apparatus for executing a first series of instructions consisting of one or a plurality of instructions stored in the areas which are distinguished by the first area recognizing symbol in the first memory device; an instruction prefetching apparatus for fetching a second series of instructions string consisting of one or a plurality of instructions stored in the area which is distinguished by the second area recognizing symbol having the order which is subsequent to the area which is distinguished by the first area recognizing symbol while the first series of instructions are being executed by the execution apparatus; and a second memory device for storing a third series of instructions by use of the third area recognizing symbol as an index in the case where the third series of instructions are fetched when an amount of instruction data fetched in the instruction prfetching apparatus is below a constant value, the third series of instructions consisting of one or a plurality of instructions stored in the area which is distinguished by the third area recognizing symbol of the first memory device.

In the invention, when an amount of instruction data stored in the instruction prefetching apparatus are below a constant value, the prefetched instruction data are stored into the second memory device.

According to the invention, when an amount of instruction data stored in the instruction prefetching apparatus is below a constant value, the prefetched instruction data is stored into the second memory device and when the same series of instructions string were again executed, the instruction data is fetched from the second memory device, thereby making it possible to suppress the possibility that the instruction prefetching apparatus becomes empty. Therefore, the effective processing speed of the data processing apparatus can be raised.

DETAILED DESCRIPTION OF THE INVENTION

Figure 1:
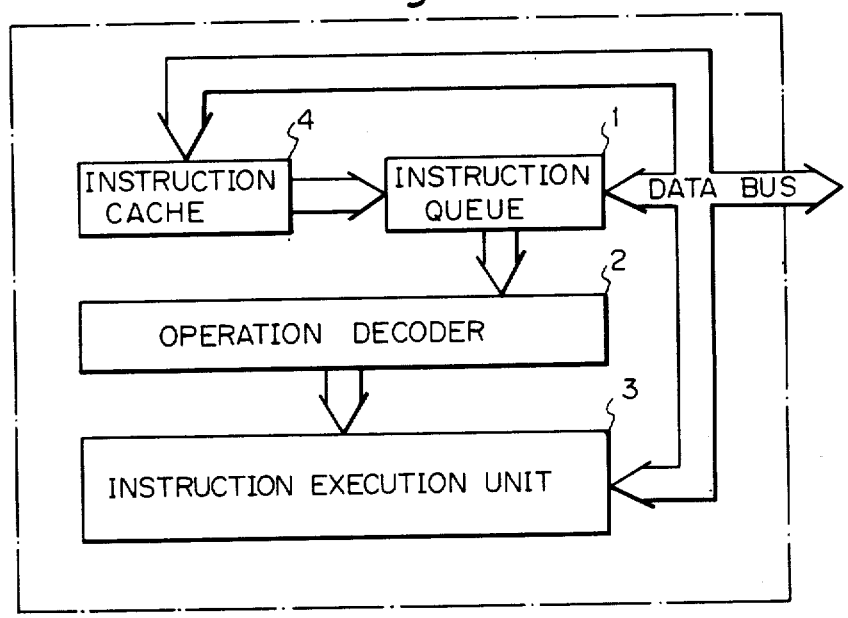
FIG. 1 is a block diagram showing an embodiment of a microprocessor of a data processing apparatus according to the present invention.

FIG. 1 is a block diagram showing an embodiment of a microprocessor of a data processing apparatus according to the present invention. In FIG. 1, reference numeral 1 denotes the instruction queue as the instruction prefetching apparatus; 2 denotes the operation decoder; 3 denotes the instruction execution unit as the execution apparatus; and 4 denotes an instruction cache as a second memory device.

Figure 2:
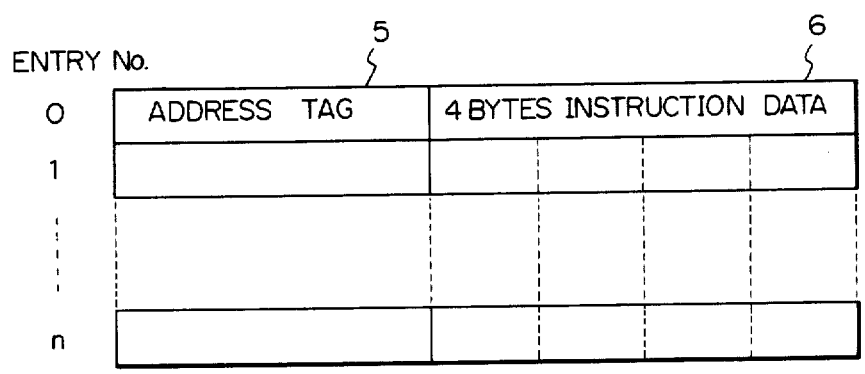
FIG. 2 is a constitutional diagram showing an example of a constitution of an instruction cache.
Figure 3:
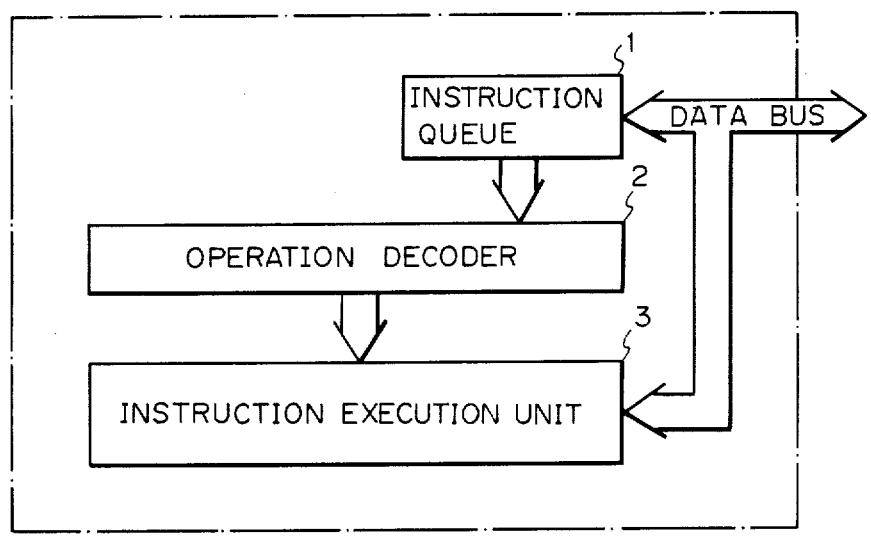
FIG. 3 is a block diagram showing a microprocessor of a conventional data processing apparatus.

FIG. 2 shows an example of a constitution of the instruction cache 4 in the case of the entry numbers 0 to n. In the diagram, numeral 5 denotes an address tag as an area recognizing symbol and 6 indicates instruction data of four bytes which start from the address of the address tag 5.

The operation of the microprocessor in FIG. 1 will now be described. In general, the instruction queue 1 performs the queuing operation from the main memory as the first memory device for storing a plurality of instructions into a plurality of memory areas which were ordered by area recognizing symbols based on a predetermined rule. However, when an amount of instruction data stored in the instruction queue 1 decreases to an amount below a constant value while a certain series of instructions are being executed, the instruction queue 1 searches the instruction cache 4. In the instruction cache 4, when an amount of data stored in the instruction queue 1 are below a constant value while a certain recent series of instructions are being executed, the address of the instruction to be fetched next is set to the address tag 5, and the instruction data 6 of four bytes starting from that address is stored. If the series of instructions are executed for the first time or after the other instructions were stored many times after completion of the execution of the series of instructions and no desired data is left in the instruction cache 4, a cache miss occurs. In this case, the addresses of the series of instructions fetched from the main memory and the instruction data of four bytes starting from those addresses are stored.

On the other hand, if the executed series of instructions are the instructions which have recently been executed and even when the preceding series of instructions were executed, if an amount of instruction data in the instruction queue 1 are below a constant value, the possibility of cache hit will be high. When the cache was hit, the instruction queue 1 queues the instruction data stored in the instruction cache 4. Therefore, there is no need to wait until the instruction is fetched from the main memory and the possibility such that the instruction queue 1 becomes empty can be reduced.

In execution of a loop or the like, if an amount of instruction data in the instruction queue 1 are below a constant value when a certain series of instructions have once been executed, the same situation often occurs also when the same series of instructions are executed again. The hit ratio of the cache rises. Therefore, by adding the instruction cache 4, the possibility such that the instruction queue 1 becomes empty can be reduced and the effective processing speed of the microprocessor can be raised.

Further, after a branch instruction was executed, the instruction queue 1 is canceled, so that the instruction data on the branch side are stored. Therefore, the instruction fetch after the branch instruction which had recently been executed can be performed at a high speed.

In the embodiment, when an amount of instruction data stored in the instruction queue 1 are below a constant value, the prefetched instruction data are stored into the instruction cache 4. However, the prefetched instruction data can be stored when the instruction queue 1 is empty. On the other hand, when an amount of instruction data stored in the instruction queue 1 are below a constant value, the instruction cash 4 is searched. However, the instruction cache 4 can be also searched each time the instruction is prefetched.

What is claimed is:

1. A data processing apparatus comprising:
a first memory device for storing a plurality of instructions including at least first, second and third series of instructions into a plurality of memory locations which are ordered by location identifiers based on a predetermined rule and including at least first, second and third location identifiers;
an execution unit connected to said first memory device for executing the first series of instruction consisting of one or more instructions stored in memory locations which are identified by the first location identifier in said first memory device;
an instruction prefetching unit connected to said first memory device and to said execution unit for fetching the second series of instructions consisting of one or more instructions stored in memory locations which are identified by the second location identifier having an order which is subsequent to said memory locations which are identified by the first location identifier having an order which is subsequent to said memory locations which are identified by the first location identifier while said first series of instructions are being executed by said execution apparatus; and
a second memory device connected to said first memory device and to said prefetching unit for storing the third series of instructions using the third location identifier as an index in the case where said third series of instructions are fetched when an amount of instruction data fetched in said instruction prefetching unit is below a constant value, said third series of instructions consisting of one or more instructions stored in memory locations which are identified by the third location identifier of said first memory device,
wherein when a previously executed series of instructions are executed again, said third series of instructions are fetched into said instruction prefetching unit from said second memory device.

2. A data processing apparatus as set forth in claim 1 wherein said first memory device comprises the data processing apparatus main memory.

3. A data processing apparatus as set forth in claim 1 wherein said instruction prefetching unit comprises an instruction quene.

4. A data processing apparatus as set forth in claim 1 wherein said second memory device comprises an instruction cache.

5. A data processing apparatus as set forth in claim 1 further including an operation decoder connected between said instruction prefetching unit and said execution unit.

* * * * *